United States Patent
Minami et al.

(10) Patent No.: US 8,235,553 B2
(45) Date of Patent: Aug. 7, 2012

(54) LIGHTING DEVICE FOR A HEADLAMP LIGHT SOURCE

(75) Inventors: Fumihiro Minami, Tokyo (JP); Takashi Ohsawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/144,852

(22) PCT Filed: Nov. 4, 2009

(86) PCT No.: PCT/JP2009/005840
§ 371 (c)(1),
(2), (4) Date: Jul. 15, 2011

(87) PCT Pub. No.: WO2010/092643
PCT Pub. Date: Aug. 19, 2010

(65) Prior Publication Data
US 2011/0280035 A1 Nov. 17, 2011

(30) Foreign Application Priority Data
Feb. 16, 2009 (JP) .................. 2009-032620

(51) Int. Cl.
*F21V 29/00* (2006.01)
(52) U.S. Cl. ......... 362/265; 362/263; 362/546; 362/549
(58) Field of Classification Search .................. 362/263, 362/265, 546, 549, 267, 507; 315/82
See application file for complete search history.

(56) References Cited

U.S. PATENT DOCUMENTS

| 4,851,968 | A | * | 7/1989 | Nino ............................. 362/539 |
|---|---|---|---|---|
| 5,119,275 | A | | 6/1992 | Makita |
| 5,584,559 | A | | 12/1996 | Toda |
| 5,678,915 | A | * | 10/1997 | Shirai et al. .................... 362/460 |
| 6,086,231 | A | * | 7/2000 | Kenjo et al. .................... 362/507 |
| 6,161,951 | A | | 12/2000 | Yoneyama et al. |
| 6,511,215 | B2 | * | 1/2003 | Hashigaya ..................... 362/515 |
| 6,821,008 | B2 | * | 11/2004 | Tokoro et al. .................. 362/539 |
| 7,144,145 | B2 | * | 12/2006 | Watanabe et al. ............. 362/544 |
| 7,261,448 | B2 | * | 8/2007 | Ishida et al. .................... 362/507 |
| 7,500,768 | B2 | * | 3/2009 | Chen ............................. 362/460 |
| 7,556,409 | B2 | * | 7/2009 | Tatara et al. ................... 362/465 |
| 7,625,109 | B2 | * | 12/2009 | Tsukamoto .................... 362/538 |
| 7,645,060 | B2 | * | 1/2010 | Andre et al. ................... 362/505 |
| 7,658,523 | B2 | * | 2/2010 | Sugimoto ...................... 362/526 |
| 7,731,403 | B2 | * | 6/2010 | Lynam et al. .................. 362/547 |
| 7,753,575 | B2 | * | 7/2010 | Mochizuki et al. ........... 362/545 |
| 7,806,562 | B2 | * | 10/2010 | Behr et al. ..................... 362/294 |
| 7,862,217 | B2 | * | 1/2011 | Suzuki et al. .................. 362/545 |
| 7,950,837 | B2 | * | 5/2011 | Yatsuda et al. ................ 362/545 |

(Continued)

FOREIGN PATENT DOCUMENTS

| JP | 4-26002 A | 1/1992 |
|---|---|---|
| JP | 7-57503 A | 3/1995 |
| JP | 10-172303 A | 6/1998 |
| JP | 2002-367413 A | 12/2002 |

(Continued)

*Primary Examiner* — Ali Alavi
(74) *Attorney, Agent, or Firm* — Birch, Stewart, Kolasch & Birch, LLP

(57) ABSTRACT

A lighting device for a headlamp light source includes an connector to be connected to cables for supplying power to the light source, and attached to the bottom of a headlamp case that houses a light source, wherein the output connector is formed such that when the lighting device is attached to the headlamp case, the bottom of a connection opening to which cables of the output connector are connected is disposed at a higher position than a bottom face inside the headlamp case.

18 Claims, 6 Drawing Sheets

U.S. PATENT DOCUMENTS

| | | | |
|---|---|---|---|
| 8,075,166 B2 * | 12/2011 | Ohno et al. | 362/310 |
| 8,083,393 B2 * | 12/2011 | Yu | 362/654 |
| 8,093,613 B2 * | 1/2012 | Yatsuda et al. | 257/98 |
| 2001/0036080 A1 * | 11/2001 | Shirai | 362/460 |
| 2002/0191413 A1 * | 12/2002 | Hayakawa et al. | 362/544 |
| 2004/0114389 A1 | 6/2004 | Yokoi et al. | |
| 2008/0304279 A1 | 12/2008 | Sugiura et al. | |

FOREIGN PATENT DOCUMENTS

| | | |
|---|---|---|
| JP | 2004-179018 A | 6/2004 |
| JP | 2005-203187 A | 7/2005 |
| JP | 2005-302743 A | 10/2005 |
| JP | 2008-10216 A | 1/2008 |
| JP | 2008-10217 A | 1/2008 |
| JP | 2008-305641 A | 12/2008 |

* cited by examiner

LIGHTING DEVICE FOR A HEADLAMP LIGHT SOURCE

TECHNICAL FIELD

The present invention relates to a lighting device for a light source to be attached to a case of a vehicle-mounted headlamp, and more particularly, relates to the shape of an output connector.

BACKGROUND ART

In a vehicle-mounted headlamp, the following configuration is known: when a lighting device for a light source is attached to an opening portion provided at the bottom of a headlamp case, such that the lighting device for a light source constitutes part of a wall portion of the headlamp case, the headlamp case and the lighting device for a light source are integrated to thus ensure a water proofing property in the headlamp.

As the lighting device for a light source employed in the headlamp thus constructed, there is the one in which an output connector to which an output harness for supplying power to a light source is connected is provided within a recessed portion at the top of a case of the lighting device for a light source (Patent document 1).

PRIOR ART DOCUMENTS

Patent Documents

Patent document 1: JP-A-2002-367413

SUMMARY OF THE INVENTION

Problem to be Solved by the Invention

In Patent document 1, however, since the output connector is disposed at a position lower than the bottom face inside the headlamp case, the water pooled on the bottom face inside the headlamp case is flown therein; thus, there is a problem such that the output connector is susceptible to water immersion.

Therefore, it is an object of the present invention to provide a lighting device for a head lamp light source in which an output connector is not readily susceptible to water immersion.

Means for Solving the Problem

A lighting device for a headlamp light source according to the invention of the application comprises: an output connector to be connected to cables for supplying power to a light source, and attached to an opening portion provided at the bottom of a headlamp case that houses a light source, wherein the output connector is formed such that when the lighting device for a headlamp light source is attached to the headlamp case, the bottom of a connection opening to which cables of the output connector are connected is disposed at a higher position than a bottom face inside the headlamp case.

Effect of the Invention

In the lighting device for a headlamp light source according to the invention of the application, the output connector is formed such that when the lighting device for a headlamp light source is attached to the headlamp case, the bottom of a connection opening to which the cables of the output connector are connected is disposed at a higher position than the bottom face inside the headlamp case; thus, no inflow of the water pooled on the bottom face inside the headlamp case is performed, and thus the output connector can be not susceptible to water immersion.

BEST MODE FOR CARRYING OUT THE INVENTION

Embodiment 1

Figure 1:
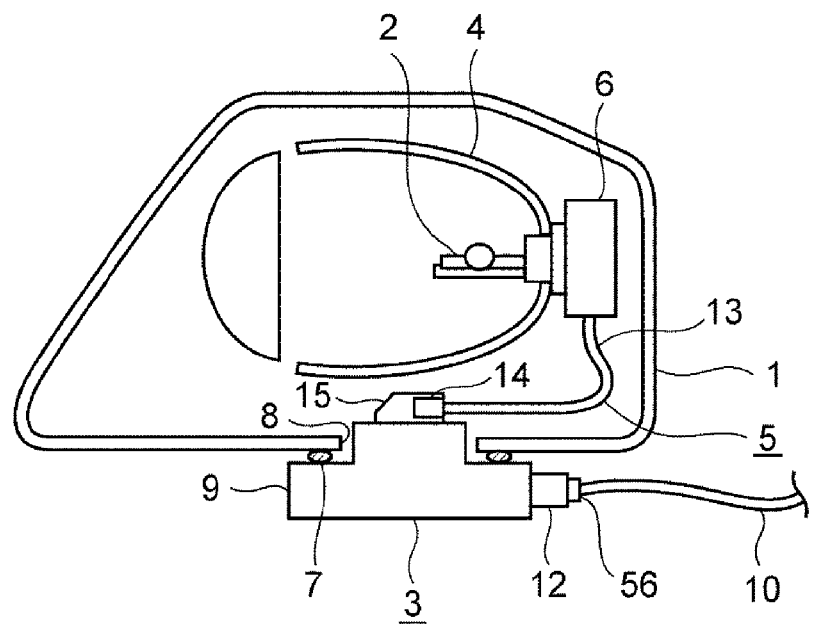
FIG. 1 is a partial cross-sectional diagram illustrating a vehicle-mounted headlamp according to one embodiment of the present invention.

FIG. 1 is a partial cross-sectional diagram illustrating a vehicle-mounted headlamp according to one embodiment of the present invention. In the drawing, a vehicle-mounted headlamp is composed of a headlamp case 1, a discharge lamp 2, a lighting device 3, a reflecting mirror 4, an output harness 5, an igniter 6, a waterproof member 7, and a power supply harness 10.

The headlamp case 1 encloses the discharge lamp 2, the reflecting mirror 4, the igniter 6 and the output harness 5. A circular opening portion 8 for attaching the lighting device 3 thereto is formed at the base of the headlamp case 1.

The lighting device 3 is attached to the opening portion 8 of the headlamp case 1 by way of the waterproof member 7, and an output male connector 15 provided at the top of the lighting device 3 protrudes through the opening portion 8 into the headlamp case 1. An output female connector 14 formed at an end portion of the output harness 5 on the side of the lighting device 3 is connected to the connector 15. The igniter 6 is connected to the other end of the output harness 5, and thus the lighting device 3 is electrically connected to the igniter 6. A cable portion 13 of the output harness 5 extends downwards below the igniter 6, is then bent and turned towards the connector 15, and is connected to the connector 14. The connection point between the cable portion 13 and the connector 14 is positioned inside the opening portion 8 of the headlamp case 1.

The igniter 6 is constituted by, for instance, a transformer having a large turn ratio between the primary side and the secondary side, and initiates discharge of the discharge lamp 2 by applying a high-voltage pulse of approximately 20,000 V to the discharge lamp 2 on the basis of the voltage applied from the lighting device 3. Further, the discharge lamp 2 is also electrically connected to the lighting device 3 via the igniter 6, and the lighting device 3 controls lighting of the discharge lamp 2 by supplying power to the discharge lamp 2 via the output harness 5. For instance, when a voltage-current curve for keeping constant the light output of the discharge lamp 2 has been stored in the lighting device 3, lighting control is performed on the basis of that curve in such a manner that the light output of the discharge lamp 2 is kept constant.

The reflecting mirror 4 is fixed to the headlamp case 1 by way of a mounting member (not shown) so as to surround the discharge lamp 2, and reflects the light from the discharge lamp 2 to the front (left in FIG. 1). The front face of the headlamp case 1 is configured to enable passing through light, such that the light reflected by the reflecting mirror 4 is emitted forward through the front face of the headlamp case 1.

The waterproof member 7 is an elastic member having a waterproofing property and made of a rubber material, for example, and is pressed in the vertical direction by the lower face of the headlamp case 1 and the top face of the lighting device 3 to be in close contact with the headlamp case 1 and the lighting device 3, thereby preventing infiltration of the water, which travels along the lower face of the headlamp case 1 or the top face of the lighting device 3, into the headlamp case 1.

The power supply harness 10 is a cable for supplying power from a battery (not shown) to the lighting device 3. A power supply input male connector 56 is formed at the end portion on the side of the lighting device 3, and the input male connector 56 is connected to the power supply input male connector 12 that is provided in the lighting device 3. The other end of the power supply harness 10 is connected to the battery (not shown), and the lighting device 3 is grounded via the power supply harness 10.

Figure 2:
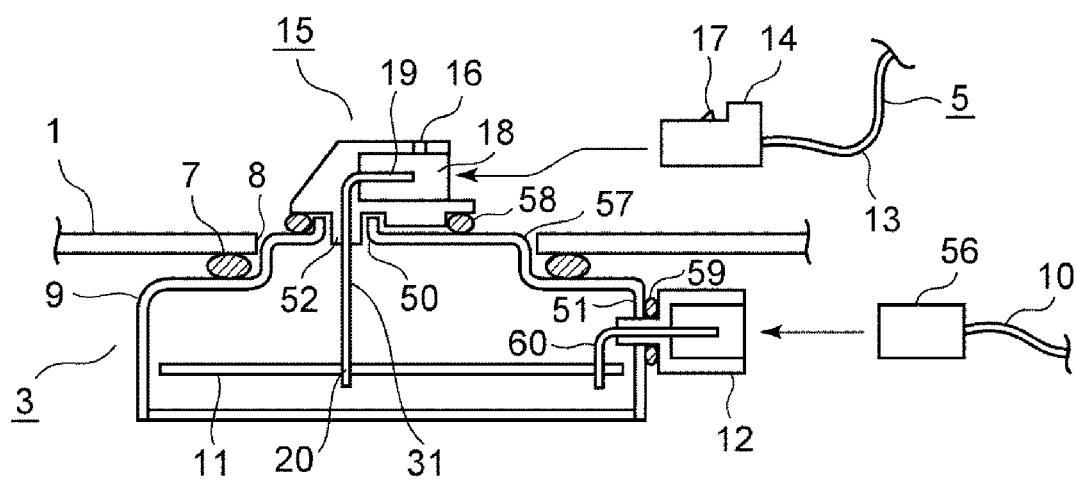
FIG. 2 is a cross-sectional diagram illustrating a lighting device 3 according to the one embodiment of the invention.
Figure 3:
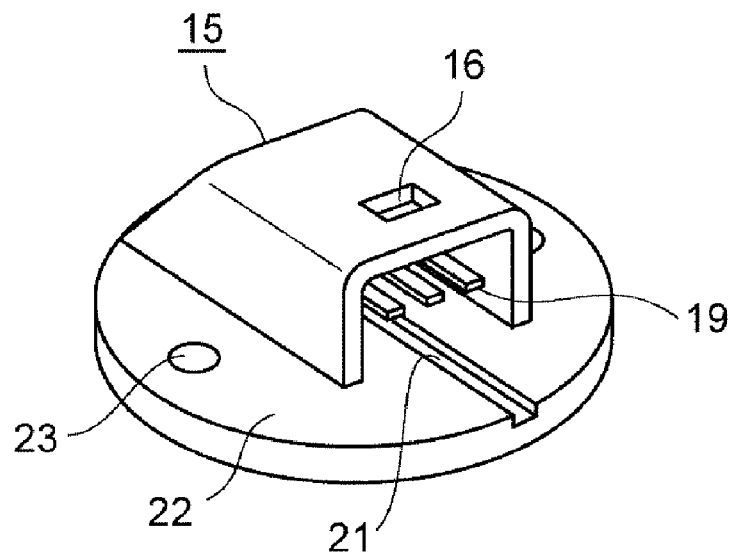
FIG. 3 is an exploded perspective diagram illustrating an output male connector 15 according to the one embodiment of the invention.
Figure 4:
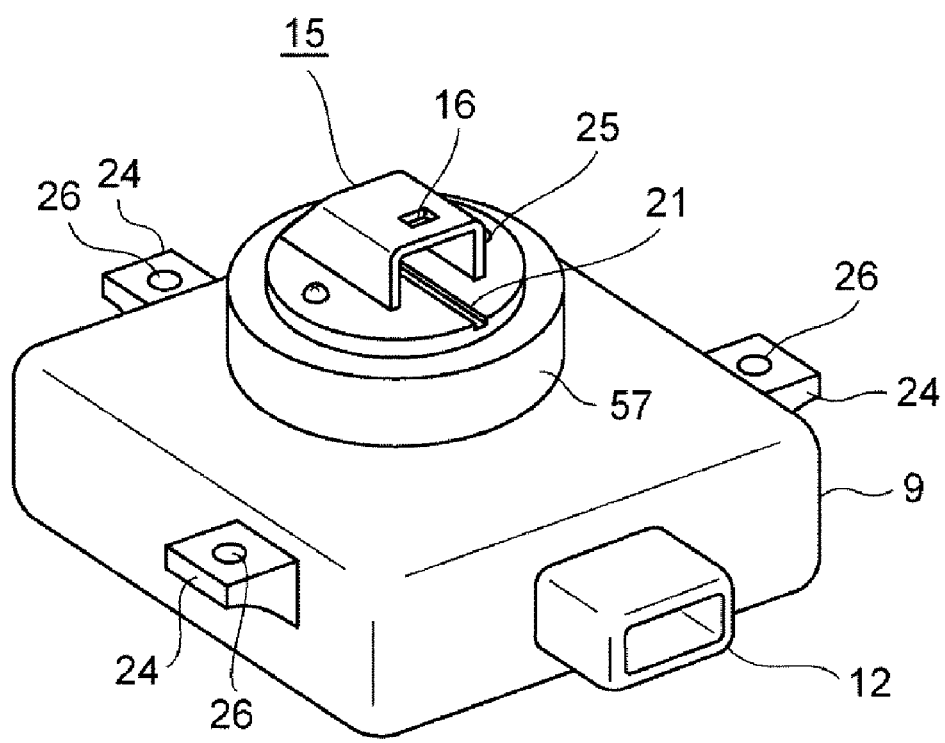
FIG. 4 is a perspective diagram illustrating the lighting device 3 according to the one embodiment of the invention.

Next, an explanation will be given of the detailed structure of the lighting device 3 and the positional relationship between the lighting device 3 and the headlamp case 1 with reference to FIG. 2 to FIG. 4. FIG. 2 is a partial cross-sectional diagram illustrating the lighting device 3 in a state before the connection of the output harness 5 and the power supply harness 10 to the lighting device 3. Note that only part of the headlamp case 1 is shown in the figure. FIG. 3 is a perspective diagram illustrating the connector 15. FIG. 4 is a perspective diagram illustrating the lighting device 3. In FIG. 2 to FIG. 4, features identical or corresponding to those in FIG. 1 are denoted with the same reference numerals, and explanations thereof will be omitted.

The case 9 is formed by aluminum die-casting, and a board 11, on which a lighting circuit for lighting control of the discharge lamp 2 is incorporated, is fixed in the interior of the case 9. A cylindrical portion 57 having an opening portion 50 in the top face is formed at the top of the case 9, and the connector 15 is mounted to the top face of the case 9 with a protrusion 52 inserted into the opening portion 50. A waterproof member 58 is interposed between the connector 15 and the case 9 to thus prevent infiltration of the water that travels between the connector 15 and the case 9 from the inside of the headlamp case 1 into the case 9.

The connector 15 has an insertion portion 18 (connection opening) opened in a direction substantially parallel to the face of the headlamp case 1 to which the case 9 is fixed, and terminal portions 19 of an output wire 31 are disposed inside the insertion portion 18. Upon insertion of the connector 14 of the output harness 5 into the insertion portion 18, a connector fixing claw 17 formed in the connector 14 engages with a connector fixing hole 16 that is formed in the connector 15, whereby the connector 14 is fixed to the connector 15. As a result, the output wire 31 and an output wire (power output wire) contained in the output harness 5 are electrically connected to each other, and power can be supplied to the discharge lamp 2 and the igniter 6.

In the connector 15, the output wire 31 is bent towards the board 11, passes through the opening portion 50, and reaches the board 11 in the case 9 out of the protrusion 52, and further is soldered to the board 11 at a junction 20 that is a portion reached by the output wire 31.

The power supply input male connector 12 is mounted to a side portion of the case 9, with part of the power supply input male connector 12 inserted into an opening portion 51 formed in the side portion. The connector 12 and the board 11 are connected by way of the input wire 60, whereby power is supplied to the lighting circuit on the board 11. A waterproof member 59 is interposed between the connector 12 and the case 9 to prevent infiltration of the water traveling between the connector 12 and the case 9 into the case 9. The connector 12 is opened in substantially the same direction as the connector 15.

The diameter of the cylindrical portion 57 of the case 9 is formed to be smaller than the opening portion 8 of the headlamp case 1, and the cylindrical portion 57 enters the opening portion 8 in a state where the case 9 is attached to the headlamp case 1. For this reason, the connector 15 provided at the top face of the cylindrical portion 57 is disposed at a position higher than the position of the bottom face inside the headlamp case 1. In particular, the bottom face of the insertion portion 18 of the connector 15 is disposed at a higher position than the bottom face inside the headlamp case 1, whereby even if the connector 15 is subjected to water immersion, the water is flown down into the headlamp case 1 from the connector 15, thereby reducing connection faults caused by such water immersion or subjection.

Screw holes (not shown) are formed in the case 9 to allow screwing of screws 25, as illustrated in FIG. 4. The connector 15 is fixed to the case 9 by the screws 25. Protrusions 24 provided with screw holes 26 are provided on the side of the lighting device 3. The lighting device 3 is fixed to the headlamp case 1 by screws not shown.

As illustrated in FIG. 3, the connector 15 is a three-terminal connector having a terminal portion 19 containing three terminals. The terminals at the terminal portions 19 are electrically connected to the lighting circuit on the board 11.

The output harness 5 comprises three output wires respectively corresponding to the three terminals of the terminal portions 19; when the connector 14 is connected to the connector 15, power is supplied from the lighting circuit on the board 11 to respective output wires contained in the output harness 5. For instance, 85 (V), 400 (Hz) AC power for lighting the discharge lamp is supplied to two of the output wires, while power for high-voltage pulse generation by the igniter 6 is supplied to the remaining output wire.

A drain groove 21 is formed at the top face of a disc portion 22 formed in a disc as a recess-like groove extending from the interior of the insertion portion 18 to the outer periphery, and drains the water inside the insertion portion 18 into the headlamp case 1. By the formation of the drain groove 21, the water inside the insertion portion 18 can be readily removed therefrom, so that abnormal events caused by a drop in resistance between output terminals on account of water immersion can be resolved quickly. The shape of the drain groove 21 is not limited to a recessed shape, and may be shaped as a depression toward the outer periphery. Note that to increase the water draining ability, the drain groove 21 may be formed so as to slope toward the outer periphery. The screw holes 23 are through-holes for fixing the connector 15 to the case 9.

As illustrated in FIG. 1, it is configured that the vehicle-mounted headlamp has a structure wherein the lighting device 3 is attached to the headlamp case 1 to be formed as part of the wall of the headlamp case 1, to ensure the waterproof property of the vehicle-mounted headlamp in a single whole, thus, no water infiltrates into the headlamp case 1 during an ordinary use. However, water may infiltrate into the headlamp case 1 in the event that the waterproof property of the headlamp case 1 is imperfect on account of a vehicle deformation because of an accident, or in the event that the maintenance cover to be mounted at the rear of the headlamp case 1 unintentionally fails to be fitted thereto.

In the event that the connector 15 is subjected to water and the terminal portions 19 are immersed in the water due to the water infiltrated into the case 1, output power (constant power) commensurate with the resistance of water at that time is supplied by the lighting device 3, in the same way as constant power is supplied from the lighting device 3 upon connection of a fixed resistance to the lighting device 3.

A comparatively large current flows initially when voltage is applied across the terminal portions 19 in a state where water is pooled in the narrow space within the connector 15. This current flow gives rise to electrolysis in the water.

When the water is electrolyzed, bubbles (gas) are generated, which exerts a pressure on the water, and the generated heat causes the water to vaporize; thus, the flow of the current drops quickly. On the other hand, as the bubbles generated by the electrolysis are removed, if the water infiltrates into the connector 15, the resistance value may drop again. As mentioned above, the water interposed resistance fluctuates depending on the current flow, and the resistance value is unstable and non-constant; thus, it can be determined whether the water is present between the terminal portions 19 or not by detecting such instability.

To be more specific, in order to detect the value of the connected resistance (resistance of the water interposed between terminal portions 19), the flowing current and the applied voltage of the discharge lamp 2 are measured, and the resistance value is sampled over time (for instance, at intervals of 0.1 second). If the resistance value at each sampling fluctuates, it is determined that the resistance is not a fixed one, and that an abnormal operation occurs (terminal portions 19 immersed in water).

It is to be noted that when the discharge lamp 2 is connected to the lighting device 3, the resistance of the discharge lamp 2 goes on rising until the state of the discharge lamp 2 stabilizes, but does not drop. By contrast, in the event that the water immersion occurs, the resistance value rises and drops repeatedly. Therefore, although the resistance value fluctuates in both the cases that the discharge lamp 2 is connected thereto and that the terminal portions 19 are immersed in water, water immersion of the terminal portions 19 can be determined by detecting the reduction in the resistance value.

At the time when the terminal portions 19 are immersed in water, the operation of the lighting device 3 is discontinued until the power supply of the lighting device 3 is powered on again. Thereafter, lighting stop and trial through turning on of the power supply are repeated until the water is dried off. The lighting operation carries on, if the connector 15 is slightly subjected to the water, the water is electrolyzed through the current flow and dried off by heating.

As mentioned above, in the event that the connector 15 is subjected to water immersion and the terminal portions 19 are immersed in water due to the water infiltrating into the case 1, the resistance value of the terminal portions 19 of the connector 15 is dropped on account of current leakage through the water. Since the state of the discontinued lighting operation persists while the terminal portions 19 are immersed in water, it is necessary to drain the water from around the terminal portions 19. Therefore, in the lighting device for a headlamp light source of the present embodiment, the bottom of the insertion portion 18 of the connector 15 is disposed at a position higher than the bottom of the headlamp case 1, so that the water in the insertion portion 18 flows down into the headlamp case 1, whereby it is possible to suppress the pool of the water into the insertion portion 18. Also, there is an effect to suppress the infiltration of the water into the insertion portion 18.

Further, since the terminal portions 19 of the output wire 31 are disposed at a position higher than the bottom of the headlamp case 1, it is possible for the terminal portions 19 to be not susceptible to water immersion even if water infiltrates into the insertion portion 18.

Incidentally, in the structure of the connector 15, the lighting operation of the lighting device 3 is discontinued by virtue of the above failsafe function, in the event that the terminal portions 19 is immersed in the water, even temporarily; however, the water immersion of the connector 15 is a transient abnormal situation, and also the anomaly in the lighting operation is likewise a transient anomaly. For this reason, so long as the infiltration of water into the lighting device 3 does not lead to destruction of the lighting device 3, no water immersion leads to a serious issue.

In addition, since the insertion portion 18 is opened sideways, the spacing between the reflecting mirror 4 and the output harness 5 can be made wider upon connection of the output harness 5 to the connector 15. Also, the output harness 5 can be routed along the inner wall of the headlamp case 1. The clearance between the output harness 5 and the high-temperature reflecting mirror 4 is secured thereby in an easy manner.

In conventional cases where the insertion portion 18 is opened upwards, it is difficult to provide the connector 15 so as to protrude into the headlamp case 1 with a view to preventing interference between the output harness 5 and the reflecting mirror 4. Herein, the sideways opening of the insertion portion 18 suppresses interference between the output harness 5 and the reflecting mirror 4, which makes it easier for the connector 15 to be disposed at a position higher than the bottom face inside the headlamp case 1. Even when water pools at the bottom of the headlamp case 1, the likelihood that terminal portions 19 in the insertion portion 18 are subjected to water immersion is lowered by making it possible to raise the lowermost position of the insertion portion 18 at a position higher than the bottom face inside the headlamp case 1.

In addition, the drain groove 21 is provided in the connector 15, and hence water is unlikely to remain in the insertion portion 18 of the connector 15. Thus, abnormal events can be solved in a short time.

Incidentally, water immersion of the connector 15 is a transient occurrence, and hence the connector 15 may be non-waterproof without a cover; thus, the connector can be made cheaper and smaller.

The lighting device 3 is often attached at substantially the center of the headlamp case 1, and the power supply harness 10 is often routed from the vehicle body side, namely from the rear of the headlamp towards the center of the headlamp. Also, since the discharge lamp 2 is disposed substantially at the center of the headlamp case 1, the igniter 6 on which the discharge lamp 2 is mounted is attached to the discharge lamp 2 on the side of the vehicle body, namely on the rear of the headlamp; thus, the output harness 5 is routed from the rear of the headlamp towards the center of the headlamp. For this reason, the direction of the opening of the connector 15 and the direction of the opening of the connector 12 are substantially the same direction, and hence the power supply harness 10 and the output harness 5 can be routed in a naturally bent manner. Such a configuration can be adapted to multiple vehicle types to allow reducing variations in the lighting device, which enhances mass production effects.

On the other hand, though the heat generated inside the lighting device 3 must be dissipated, the case 9 is fabricated by using aluminum having a favorable heat dissipation characteristic, and also the connector 15 is fabricated by using a resin having a favorable insulating property and amenable to formation of fine shapes, whereby the lighting device 3 having the advantageous characteristics of both aluminum and resins can be achieved. That is, fabricating the case 9 and the connector 15 out of different parts allows combining parts suitable for respective functions to thus obtain a lighting device having favorable characteristics.

Further, when the outer periphery of the connector 14 is disposed inward of the opening portion 8 of the headlamp case 1, attachment and detachment of the lighting device 3 to the headlamp case 1 are facilitated.

Furthermore, in the foregoing, though the connector fixing hole 16 is provided in the connector 15, while the connector fixing claw 17 is provided in the connector 14, these configuration may be reversed. Also, the connector fixing hole 16 is provided at the top of the connector 15, but may be provided on the side portion thereof.

Incidentally, the instance in which the discharge lamp 2 is lighted by the lighting device 3 is described in the foregoing, an LED may be lighted instead. In this case, the failsafe function involves controlling the lighting device 3 in such a manner that a total current of the current flowing in the LED and the current flowing in the water resistance is an original output current (constant current); as a result, the occurrence of a drop in the resistance value can be determined through detection of a drop in the output voltage.

Embodiment 2

Figure 5:
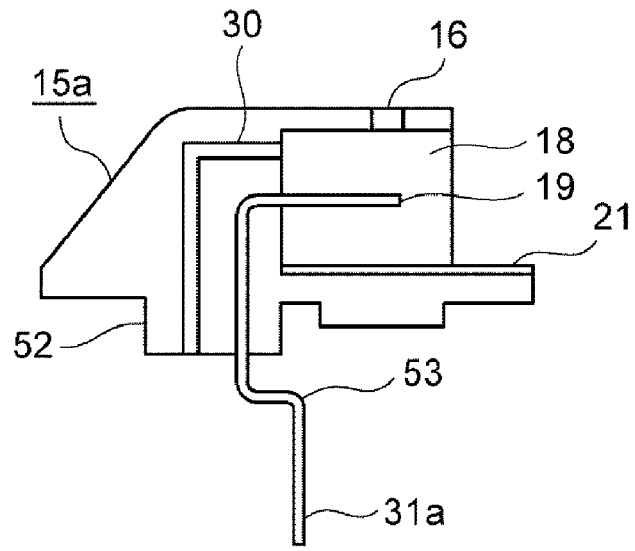
FIG. 5 is a cross-sectional diagram illustrating an output male connector 15a of the invention.

FIG. 5 is a cross-sectional diagram illustrating an output male connector 15a according to Embodiment 2. In FIG. 5, a vent hole 30 is provided in the connector 15a, and a crank bent portion 53 is provided in the output wire 31a.

The vent hole 30 is a through-hole that runs from the insertion portion 18 into the case 9. One opening portion of the vent hole 30 is provided at the same wall face as the one at which the terminal portions 19 are provided inside the insertion portion 18, but at a higher position than the terminal portions 19, and the other opening of the vent hole 30 is provided at the lower face of the protrusion 52 that is inserted into the opening portion 50 of the case 9.

The crank bent portion 53 is formed in the output wire 31a. The output wire 31a is formed by insert molding with the connector 15a, and also soldered to the board 11; therefore, a mechanical connection path is formed by a soldered portion (junction 20) of the board 11, an output wire 31a, a connector 15, a case 9, a board 11 and a soldered portion in the order. Since the extents of shrinkage and expansion due to a temperature change are different for each member, there arise differences in the extents of expansion and shrinkage between one path that leads from the soldered portion to the connector 15 via the output wire 31a, and the other path that leads from the soldered portion to the connector 15 via the board 11 and the case 9, which may generate a stress in the soldered portion. It is not found that this stress is small enough, with respect to the strength of the soldered portion, so as to be non-problematic; thus, repeated applications of the stress due to repeated changes in temperature may give rise to cracks in the soldered portion.

Therefore, in Embodiment 2, the crank bent portion 53 is formed in the output wire 31a. The crank bent portion 53 absorbs the difference in the extent of shrinkage or expansion that arises between the paths by deflecting in a supple manner to relieve the stress generated in the soldered portion and reduce the strain, thereby preventing the occurrence of cracks in the soldered portion.

As described above, providing a vent hole in the connector 15a to run through into the lighting device 3 has an effect of reducing changes in atmospheric pressure inside the device (breathing) in response to abrupt temperature changes to be possibly generated in the lighting device 3 to thus increase a waterproof property thereof. Also, sufficient water infiltration prevention can be achieved even by using a simple waterproof member (waterproof seal). Therefore, a low water resistance can be set for the waterproof member, and the waterproof structure of the lighting device 3 can be simplified. This simpler structure allows reducing costs.

Further, since the vent hole 30 is provided in the inner wall of the insertion portion 18 of the connector 15a, the vent hole is hidden in the shadow of the connector 14 with the connector 14 attached to the connector 15a, thereby suppressing the infiltration of water through the vent hole.

Additionally, when a waterproof member is added to the connector 15a having the vent hole 30 to provide a waterproof specification, the waterproof property of the connector 15a can be further enhanced by carrying out a ventilation (breathing) through an opening between the covering of the output harness 5 and the output wires.

Furthermore, since the crank bent portion 53 bent in the form of a crank is provided in the output wire 31a at a point halfway between the connector 15a and the board 11, the occurrence of cracks in the soldered portion (junction 20) between the output wire 31a and the board 11 can be suppressed.

Incidentally, in FIG. 5, the opening portion of the vent hole 30 is provided in the same face as the terminal portions 19, but may be provided on a different inner wall face, for instance.

Also, in FIG. 5, though a crank bent portion 53 is provided in the output wire 31a, it may be adopted by some other configuration that allows absorbing the extent of shrinkage or expansion arising from path differences, for instance, a U-shape, an S-shape by deforming a crank shape, or an Ω-shape by deforming a U-shape.

Embodiment 3

The connector 15a of Embodiment 2 has the protrusion 52 that is formed in a direction perpendicular to the face at which the connector 15a is mounted to the lighting device 3, and has the insertion portion 18 formed in a horizontal direction thereto; thus, there are two directions for molding-die drawing. This is problematic in that the shape thereof involved is complex, and constrains degree of freedom of design. Therefore, in Embodiment 3, it is contemplated to form a connector having a shape that allows increasing the degree of freedom of design.

Figure 6:
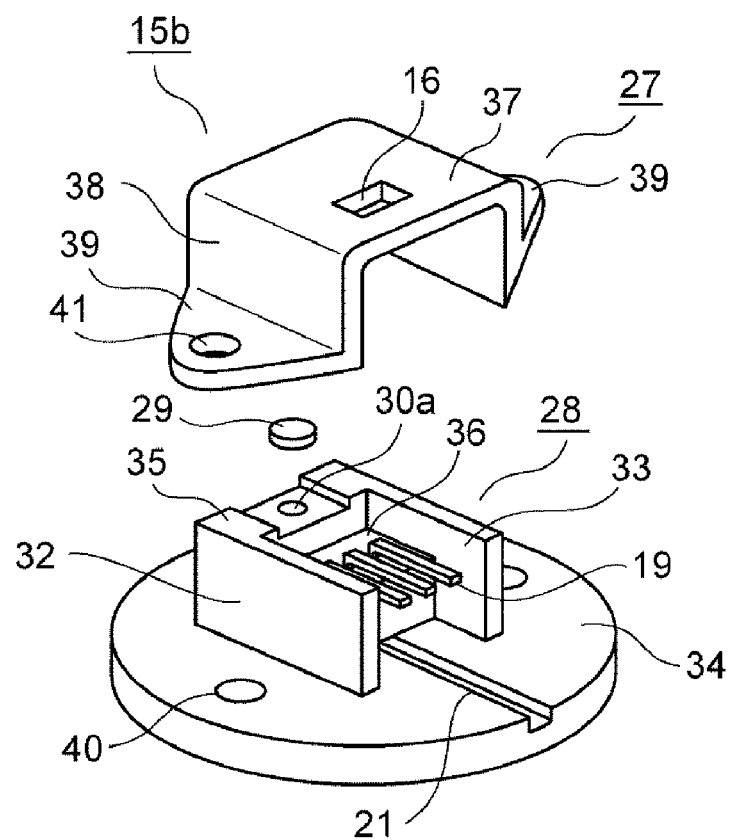
FIG. 6 is an exploded perspective diagram illustrating an output male connector 15b of the invention.
Figure 7:
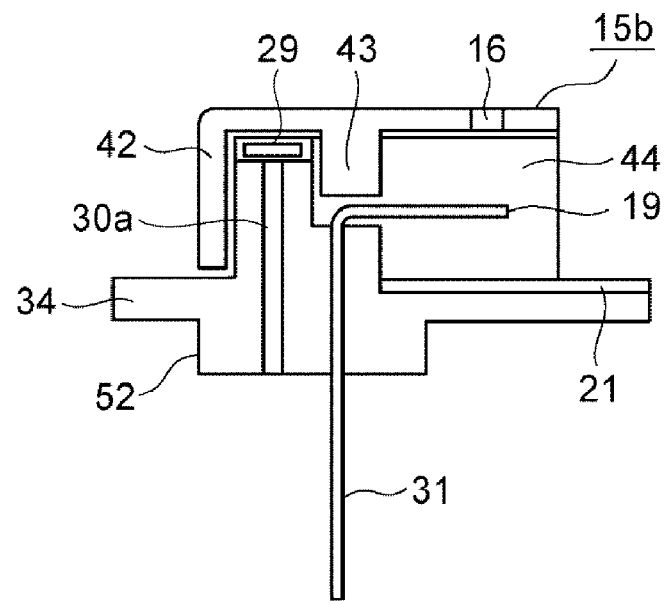
FIG. 7 is a cross-sectional diagram illustrating the output male connector 15b of the invention.

FIG. 6 is a perspective diagram illustrating an output male connector 15b according to Embodiment 3. FIG. 7 is a cross-sectional diagram thereof. In FIG. 6, the connector 15b is composed of a cover member 27, a terminal holding member 28, an output wire 31 containing terminal portions 19, and a moisture-permeable filter 29, and all these elements are formed as separate parts.

Protrusions 32, 33, 35 and 36 are formed at the top face of a disc-like portion 34 of the terminal holding member 28. The protrusion 36 is adjacent to the other protrusions 32, 33, 35 and is surrounded in three directions by the protrusions 32, 33, 35. The protrusions 32, 33, 35 are formed at substantially the same height, but the protrusion 36 is formed lower than the other protrusions. The protrusions 32, 33, 35 disposed to surround the protrusion 36 constitute an insertion portion 44, having have two wall faces formed by the protrusions 32 and 33, into which the connector 14 is inserted together with a below-described cover member 27.

An insertion opening for insertion of the output wire 31 is formed in the protrusion 36, such that the output wire 31 is press-fitted into the insertion opening. The end portion of the output wire 31 is bent at right angles with respect to the press-fit direction of the output wire 31, and comes to constitute the terminal portions 19 through press-fitting of the output wire 31 into the insertion opening.

A vent hole 30a is provided in the protrusion 35. One opening of the vent hole 30a is formed at the top face of the protrusion 35, and the other opening is provided at the lower face of the protrusion 52 that is inserted into the opening portion 50 of the case 9. The periphery of the opening portion of the vent hole 30a that is provided at the top face portion of the protrusion 35 is formed to be lower than the other sites thereof. This serves as an arrangement space for arranging the moisture-permeable filter 29. The moisture-permeable filter 29 has the ability of causing gases such as water vapor to pass therethrough, but not causing liquid water to thereby suppress infiltration of the water while preserving ventilation.

Additionally, screw holes 40 for fixing the cover member 27, the terminal holding member 28 and the case 9 are formed in the disc-like portion 34.

The protrusions 32, 33, 35 and 36, the insertion opening for press-fitting of the output wire 31, the vent hole 30a and the screw holes 40 are all formed in directions perpendicular to the mounting face of the lighting device 3; thus, the terminal holding member 28 has one direction for molding-die drawing.

The cover member 27 is mounted to the terminal holding member 28 in such a manner that the vent hole 30a and the terminal portions 19 are covered from above by a top face portion 37.

Side face portions 38 are formed at both side portions of the top face portion 37. The distance between the two side face portions 38 is greater than that between the protrusions 32, 33 of the terminal holding member 28. Upon mounting of the cover member 27 to the terminal holding member 28, both side face portions 38 are disposed outward of the protrusions 32, 33, and the top faces of the protrusions 32, 33 are covered by the top face portion 37 of the cover member 27; as a result, the insertion portion 44 of the connector 14 is formed as mentioned above.

Fixing portions 39 substantially parallel to the top face portion 37 extend outwardly of the fixing portions 39 at the lower end of the side face portions 38, and screw holes 41 corresponding to the screw holes 40 of the terminal holding member 28 are formed in the fixing portions 39. The cover member 27 is fixed to the terminal holding member 28 and to the case 9 by the screw holes 41.

Also, a rear face portion 42 adjacent to the top face portion 37 and both side face portions 38 is formed at the rear of the top face portion 37 of the cover member 27. A protrusion 43 having a narrower width than the distance between the protrusions 32, 33 of the terminal holding member 28, and substantially parallel to the rear face portion 42 is formed in the top face portion 37 at a position spaced from the rear face portion 42 by a distance corresponding to the depth-direction width of the protrusion 35 of the terminal holding member 28. The height of the protrusion 43 is lower than the distance from the terminal portions 19 to the top face portion 37 when the cover member 27 is mounted to the terminal holding member 28. Also, a connector fixing hole 16 is formed in the top face portion 37.

The distance between the two side face portions 38 is greater than that between the protrusions 32, 33 of the terminal holding member 28, and the protrusion 43 is formed at a position spaced from the rear face portion 42 by a distance corresponding to the depth-direction width of the protrusion 35 of the terminal holding member 28; thus, upon mounting of the cover member 27 to the terminal holding member 28, both the side face portions 38 and the protrusions 32, 33 are engaged with each other, and the rear face portion 42, the protrusion 43 and the protrusion 35 are likewise locked with each other; as a result, the cover member 27 is positioned with respect to the terminal support member 28.

Since the connector fixing hole 16 and the screw holes 41 are formed in a direction perpendicular to the mounting surface of the lighting device 3, the cover member 27 has one direction for molding-die drawing.

Upon fixing of the terminal holding member 28 and the cover member 27 by way of a screw (not shown), the insertion portion 44 is formed to be opened by the top face portion 37 and the protrusions 32, 33, 35 in the direction to which the terminal portions 19 are directed; thus, the connector 14 can be fitted thereto. In this way, a set of parts of the connector 15b can be molded by using a molding die having a simple shape.

As mentioned above, since the members constituting the connector 15b are divided into a terminal support member 28 and a cover member 27, the connector can be formed to an arbitrary shape while reducing constraints limit the design. Further, the molding die for manufacturing the connector 15b can be simplified, and molding speed can be made faster, thereby reducing manufacturing costs thereof.

Moreover, when the moisture-permeable filter is disposed above the opening of the vent hole 30a on the side of the connector 15b, infiltration of water can be also suppressed with securing ventilation.

Furthermore, since the surface of the moisture-permeable filter 29 that is disposed at the top face portion of the protrusion 35 is covered by the top face portion 37 of the cover member 27, the moisture-permeable filter 29 can be protected against breakage due to unintended accidents such as hitting of a dropping object. Also, apart for covering the permeable filter 29 need not be prepared separately, which allows reducing costs.

Since the cover member 27 is fixed to the terminal holding member 28 by way of screws, it can be attached surely thereto with a simple manner.

Figure 8:
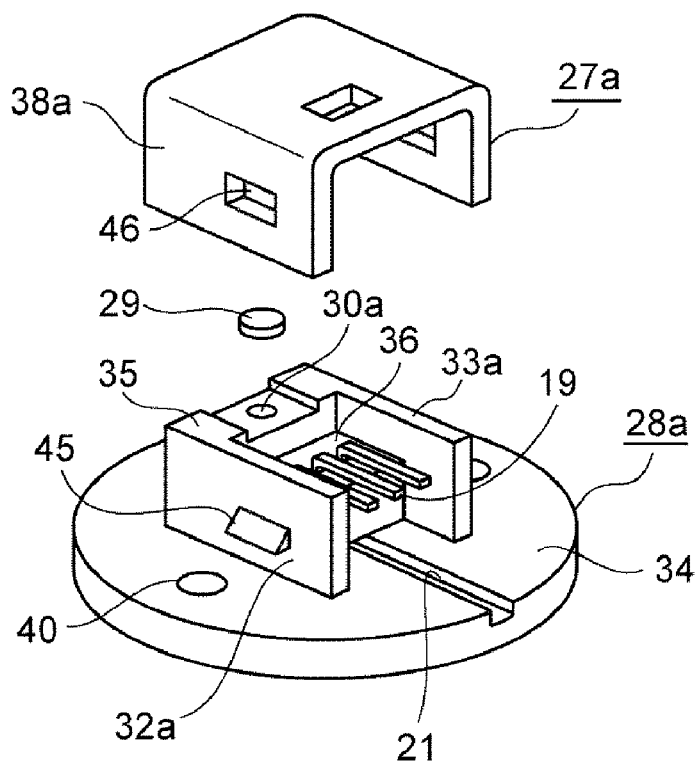
FIG. 8 is an exploded perspective diagram illustrating another embodiment of an output male connector 15d of the invention.

It is to be noted that in the foregoing, the terminal holding member 28 and the cover member 27 are fixed to each other by way of screws; however, as illustrated in FIG. 8, it is also possible to provide projections 45 on the outer faces of protrusions 32a, 33a of a terminal holding member 28a, and to provide recesses 46 at both side face portions 38a of a cover member 27a, such that the terminal holding member 28a and the cover member 27a can be fixed to each other through engaging (snap-fitting) of the recesses 46 of the cover member 27a with the projections 45 of the terminal holding member 28a.

As stated above, fixing of the cover member 27a and the terminal holding member 28a by snap fitting allows reducing costs, in that fixing members such as screws need not be prepared. Note that the projections 45 may be provided on the inner sides of both side face portions 38a of the cover member 27a, and the recess 46 may be provided in the protrusions 32a, 33a of the terminal holding member 28a.

Incidentally, in Embodiment 3, the output wire 31 is press-fitted into an insertion hole formed in the protrusion 36; however, it can be contemplated that the output wire is formed integrally as in Embodiments 1 and 2.

Also, in the foregoing, the cover member is fixed to the terminal holding portion by screwing or snap fitting; however, the fixing may also be accomplished by bonding using an adhesive or the like.

Embodiment 4

Figure 9:
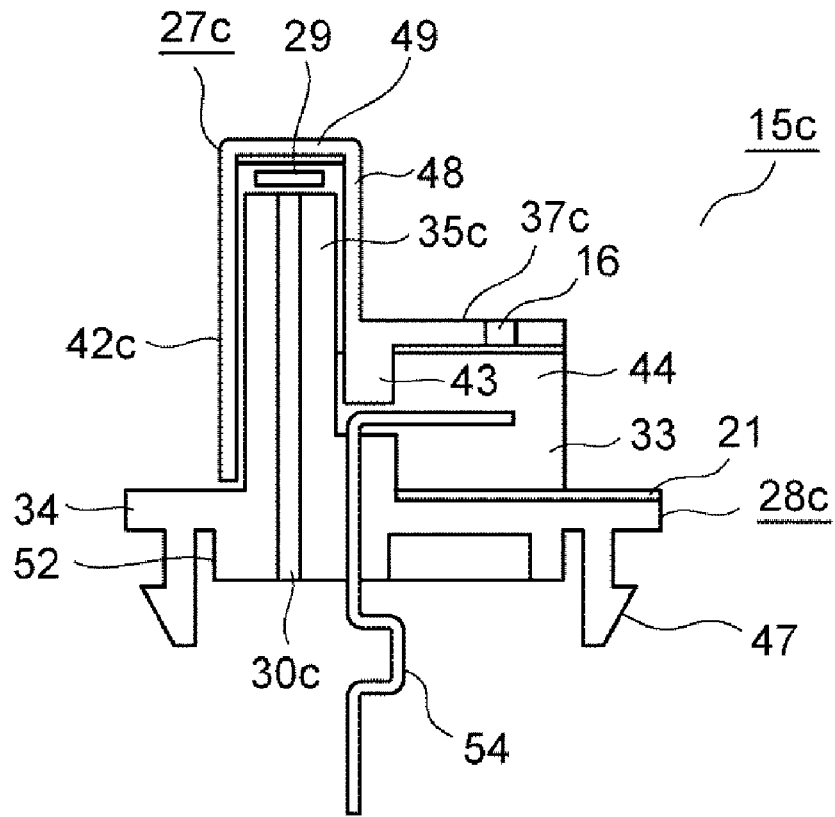
FIG. 9 is a cross-sectional diagram illustrating an output male connector 15c of the invention.

FIG. 9 is a cross-sectional diagram illustrating an output male connector 15c according to Embodiment 4. Features identical to those of FIG. 6 and FIG. 7 are denoted with the same reference numerals, and explanations thereof will be omitted.

The protrusion 35c of the terminal holding member 28c is formed higher than the protrusions 32, 33.

A fixing claw 47 is formed at the bottom of the disc-like portion 34 of the terminal holding member 28c. The connector 15c is fixed to the case 9 by providing a fixing hole with which the fixing claw 47 is engaged in the top face portion of the case 9 of the lighting device 3. Further, a vent hole 30c is formed inside the protrusion 35c, and a opening portion of the vent hole 30c is formed at the top face portion of the protrusion 35c. Furthermore, the output wire 31c has a U-shaped bent portion 54 that is bent in the form of a U-character.

A top face portion 49 of the cover member 27c on the side of the rear face portion 42c is formed at a position higher than the top face portion 37c on the front face side, in such a manner that the top face portion 49, the rear face portion 42c, the wall face portion 48 and the protrusion 35c engage with each other, upon mounting of the cover member 27c onto the terminal holding member 28c.

As described above, the protrusion 35c is formed at a higher level, and the opening portion of the vent hole 30c is provided at the top face of the protrusion 35c to suppress infiltration of water via the vent hole 30c, even when the water enters the headlamp case 1 to such an extent that the level of the water pooled at the bottom of the headlamp case 1 rises.

Incidentally, part of the output wire 31c is bent in a U-shape to thus prevent the application of a stress on the junction 20 between the output wire 31c and the board 11 due to a temperature change.

Embodiment 5

In the foregoing, an output harness 5 includes three output wires. In some cases the three output wires may emit electromagnetic some waves during lighting control of a discharge lamp 2 by a lighting device 3. These electromagnetic waves may cause malfunction of other vehicle-mounted equipments. In such cases, therefore, a conductive shielding member is provided so as surround the periphery of the three output wires.

Figure 10:
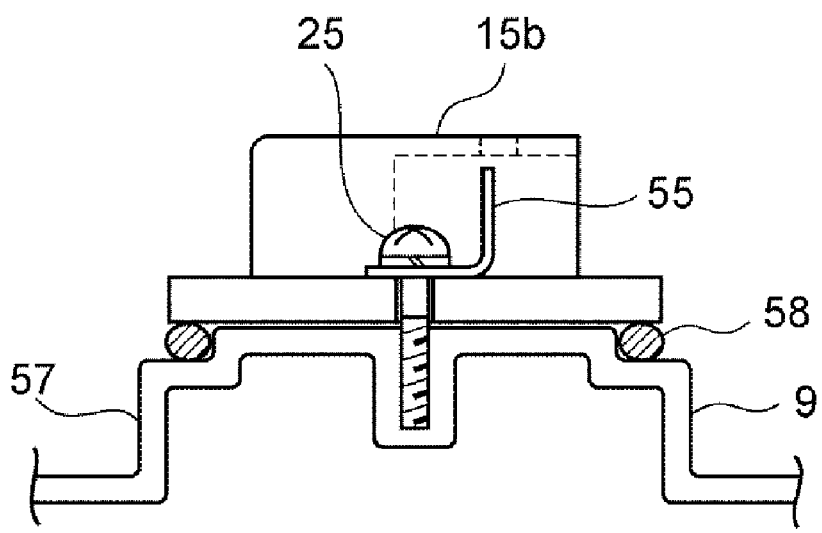
FIG. 10 is a cross-sectional diagram illustrating another embodiment of a lighting device 3 of the invention.

FIG. 10 is a cross-sectional diagram of the lighting device 3 provided with a ground terminal 55, which is a terminal for connecting the shielding member to ground. In FIG. 10, a connector 15b is mounted to a case 9 of the lighting device 3 together with a ground terminal 55 by a screw 25. The case 9 is thus grounded, and hence the ground terminal 55 electrically connected of the case 9 is likewise grounded. Thus, the ground terminal 55 can be provided in an easy manner to ground the shielding member by fixing the ground terminal 55 with the screw 25 for fixing the connector 15 thereto.

Incidentally, in FIG. 10, the connector 15b is mounted to the case 9 together with the ground terminal 55 by way of the screw 25; however, the same feature can be used for mounting the connector 15 or the connector 15a to the case 9.

Embodiment 6

In the aforementioned embodiments, the connector 15 and the case 9 are fixed to each other by way of the screws 25. However, the connector 15 may also be configured as part of the case 9, and may be formed of a resin to be integral with the case 9.

Such a configuration allows enhancing the reliability of the lighting device 3, since paths through which water enters are reduced. Assembly costs can also be reduced in that the step of assembling the connector 15 to the case 9 can be omitted. There can also be reduced, for instance, the number of parts for the water proofing structure, and the number of parts required for joining; thus, the manufacturing costs of the connector 15 can be reduced.

Further, the connectors 15b, 15c and the case 9 of the lighting device 3 are configured separately, and fixing therebetween is accomplished by way of screws, the fixing claw 47 or the like; however, the terminal holding members 28 to 28c and the case 9 may be formed integrally out of a resin. When the terminal holding member 28 is formed integrally with the case 9, the screw holes for mounting the cover member 27 may be provided on the side of the integrally-formed terminal holding member 28.

Embodiment 7

Figure 11:
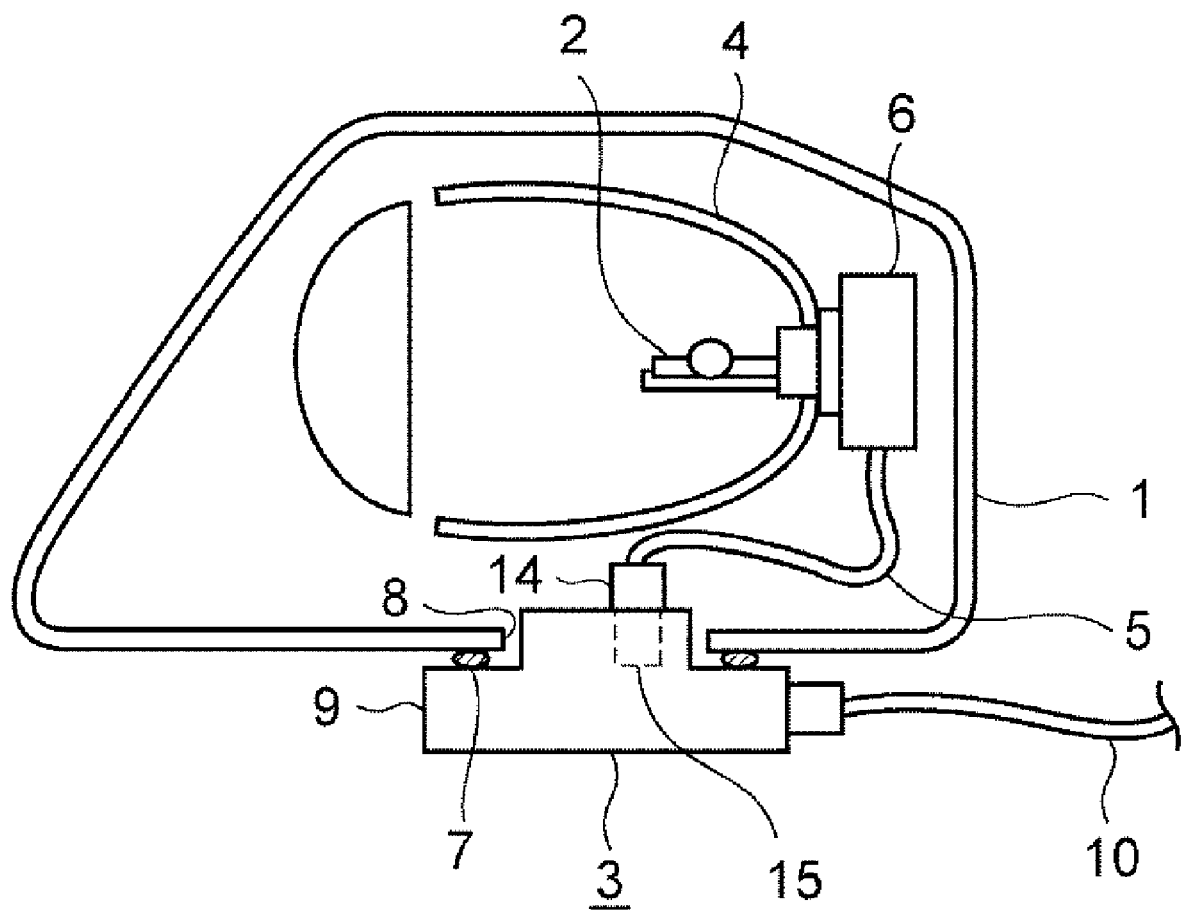
FIG. 11 is a partial cross-sectional diagram illustrating a vehicle-mounted headlamp according to another embodiment of the invention.

In the aforementioned embodiments, though the insertion portion 18 of the connector 15 is opened in a horizontal direction parallel to the face at which the case 9 is fixed to the case 1, it may also be opened in a vertical direction, as illustrated in FIG. 11. Even in this case, when the connectors are formed in such a manner that the bottom of the insertion portion is higher than the bottom face inside the headlamp case 1, the flow of water from the inside of the headlamp case 1 can be prevented. Further, when the opening hole that communicates with the case 1 is provided at the bottom of the insertion portion, water can be drained into the case 1 via the opening hole even if water infiltrates into the insertion portion. In addition to the way providing the opening hole, the water drain as described above can also be accomplished by preparing a cutout in the wall face that surrounds the insertion portion, in such a manner that the cutout reaches to the bottom of the insertion portion. Note that the opening direction of the insertion portion in the above case may be slanted at a predetermined angle, not limited to a vertical direction.

Further, in the foregoing, though the headlamp case 1 encompasses the igniter 6 and the output harness 5, part or the whole of the igniter 6 and the output harness 5 may be disposed outside the headlamp case 1.

Furthermore, in the foregoing, though the discharge lamp 2 is used as a light source for headlamps, a halogen lamp, an LED (Light Emitting Diode) or the like may also be used as the light source.

EXPLANATION OF REFERENCE NUMERALS 1 headlamp case
2 discharge lamp
3 lighting device
5 output harness
6 igniter
7 water-proofing member
8 opening portion
9 case
10 power supply harness
11 board
12 power supply input male connector
13 cable portion
14 output female connector
15 output male connector
21 drain groove
27 cover member
28 terminal holding member
29 moisture-permeable filter
30 vent hole
31 output wire
53 crank bent portion
54 U-shaped bent portion
55 ground terminal

The invention claimed is:

1. A lighting device for a headlamp light source to be attached to an opening portion provided at a bottom of a headlamp case that houses a light source, comprising:
an output connector to which an output harness for supplying power to the light source is connected,
wherein the output connector is formed in such a manner that when the lighting device for a headlamp light source is attached to the headlamp case, the bottom of a connection opening to which the output harness of the output connector is connected is disposed at a higher position than a bottom face inside the headlamp case.

2. The lighting device for a headlamp light source according to claim 1, wherein the connection opening is opened sideways.

3. The lighting device for a headlamp light source according to claim 1, wherein the output connector has a drain groove extending from inside the connection opening towards an outer edge of the output connector.

4. The lighting device for a headlamp light source according to claim 1, wherein one end of an output wire is disposed as a terminal portion in the connection opening of the output connector, and the terminal portion is exposed inside the headlamp case.

5. The lighting device for a headlamp light source according to claim 2, further comprising: an input connector to which an input harness for supplying power to the lighting device for a light source is connected,
wherein a connection opening of the input connector is opened in substantially the same direction as a direction in which the connection opening of the output connector is opened.

6. The lighting device for a headlamp light source according to claim 1, wherein the output connector has a vent hole running through from inside to outside the lighting device.

7. The lighting device for a headlamp light source according to claim 6, wherein an opening portion of the vent hole is provided inside the connection opening of the output connector.

8. The lighting device for a headlamp light source according to claim 6, wherein the output connector has a protrusion that protrudes at a higher position than the connection opening of the output connector, and an opening portion of the vent hole is provided at the top of the protrusion.

9. The lighting device for a headlamp light source according to claim 6, wherein a moisture-permeable filter is provided at the opening portion of the vent hole.

10. The lighting device for a headlamp light source according to claim 1, wherein the output connector is connected via an output wire to a board that outputs power to be supplied to the light source, and
the output wire has a bent portion halfway between the board and the output connector.

11. The lighting device for a headlamp light source according to claim 1, wherein the output connector is integrally formed with a case of the lighting device for a light source.

12. The lighting device for a headlamp light source according to claim 1, wherein the output connector is mounted to the case of the lighting device for a light source by way of a water-proofing member.

13. The lighting device for a headlamp light source according to claim 1, wherein the output connector comprises a terminal holding portion that holds a terminal of the output connector, and a cover portion mounted to the terminal holding portion.

14. The lighting device for a headlamp light source according to claim 9, wherein the output connector comprises a terminal holding portion that holds a terminal of the connector, and a cover portion mounted to the terminal holding portion, and the cover portion is mounted to the terminal holding portion to cover a surface of the moisture-permeable filter.

15. The lighting device for a headlamp light source according to claim 12, wherein the output harness for supplying power to the light source comprises a power output wire and a shielding member for shielding electromagnetic emission from the power output wire, and
the output connector is mounted with a screw to a grounded case of the lighting device for a light source together with a connection terminal to which the shielding member is connected.

16. The lighting device for a headlamp light source according to claim 1, wherein the output harness has a connector that is inserted into the connection opening of the output connector, and
the position of the output connector is set such that when the lighting device for a headlamp light source is attached to the headlamp case, outer peripheries of the output connector and a connector of the output harness are disposed inward of the opening portion that is provided at the bottom of the headlamp case.

17. The lighting device for a headlamp light source according to claim 1, the device attached to the opening portion provided at the bottom of the headlamp case that houses the light source, comprising:
a board that outputs power to be supplied to the light source;
a case that houses the board; and
an output connector which is provided at the top of the case and connected to the board via an output wire, and to which an output harness for supplying power to the light source is connected, wherein the output connector is integrally formed with the case.

18. The lighting device for a headlamp light source according to claim 1, comprising:
a plurality of output wires that connect the output connector and a board that outputs power to be supplied to the light source, such that one end portion of each of the output wires forms a terminal portion of the output connector;
a detection unit for detecting a resistance value between the terminal portions; and
a failsafe unit for discontinuing an operation of the lighting device for a headlamp light source,
wherein the failsafe unit discontinues the operation of the lighting device for a headlamp light source when the resistance between the terminal portions drops.

* * * * *